United States Patent
Chang et al.

(10) Patent No.: US 9,184,605 B2
(45) Date of Patent: Nov. 10, 2015

(54) HIGH VOLTAGE BATTERY SYSTEM FOR VEHICLE APPLICATIONS

(75) Inventors: Tsun Yu Chang, Taichung (TW); Chun-Chieh Chang, Ithaca, NY (US)

(73) Assignee: CHANGS ASCENDING ENTERPRISE CO., LTD., Situn District, Taichung (TW)

( * ) Notice: Subject to any disclaimer, the term of this patent is extended or adjusted under 35 U.S.C. 154(b) by 1136 days.

(21) Appl. No.: 13/073,091

(22) Filed: Mar. 28, 2011

(65) Prior Publication Data
US 2012/0248881 A1    Oct. 4, 2012

(51) Int. Cl.
*H04B 3/00* (2006.01)
*H02J 7/00* (2006.01)
*B60L 11/18* (2006.01)

(52) U.S. Cl.
CPC ........... *H02J 7/0016* (2013.01); *B60L 11/1866* (2013.01); *H02J 7/0026* (2013.01); *H04B 3/00* (2013.01); *B60L 2240/545* (2013.01); *Y02T 10/7005* (2013.01); *Y02T 10/7055* (2013.01); *Y02T 10/7061* (2013.01); *Y10T 307/735* (2015.04)

(58) Field of Classification Search
CPC .......................................................... H04B 3/00
USPC .................................. 307/112–113, 116, 125
See application file for complete search history.

(56) References Cited

U.S. PATENT DOCUMENTS

| | | | |
|---|---|---|---|
| 5,391,974 A * | 2/1995 | Shiojima et al. | 320/150 |
| 5,477,126 A * | 12/1995 | Shiojima | 320/138 |
| 5,747,970 A * | 5/1998 | Johnson et al. | 320/151 |
| 5,898,291 A | 4/1999 | Hall | |
| 6,060,864 A | 5/2000 | Ito et al. | |
| 6,064,178 A | 5/2000 | Miller | |
| 6,236,216 B1 * | 5/2001 | Shimoyama et al. | 324/434 |
| 6,271,645 B1 | 8/2001 | Schneider et al. | |
| 6,291,972 B1 | 9/2001 | Zhang | |
| 6,461,764 B1 | 10/2002 | Nakamura | |
| 6,465,986 B1 | 10/2002 | Haba | |
| 6,511,764 B1 | 1/2003 | Marten | |
| 6,586,909 B1 | 7/2003 | Trepka | |
| 6,642,693 B2 | 11/2003 | Anzawa et al. | |
| 6,700,350 B2 | 3/2004 | Formenti et al. | |
| 6,777,908 B2 | 8/2004 | Thorne et al. | |
| 6,784,638 B2 | 8/2004 | Yang | |
| 6,801,014 B1 | 10/2004 | Chitsazan | |
| 6,825,638 B2 | 11/2004 | Kim | |
| 6,841,971 B1 | 1/2005 | Spee et al. | |

(Continued)

FOREIGN PATENT DOCUMENTS

EP          1933443 A2 *  6/2008 ................ H02J 7/00

OTHER PUBLICATIONS

International Search Report and Written Opinion, mailed Jun. 22, 2012.

*Primary Examiner* — Adi Amrany
(74) *Attorney, Agent, or Firm* — Thomas | Horstemeyer, LLP

(57) ABSTRACT

In one embodiment, a battery management system comprising a first circuit comprising a first plurality of circuit elements arranged in series, the first plurality of circuit elements comprising: a direct current (DC) voltage source, and first plural switching devices, each of the first plural switching devices connected to, and operably switched by, a first detection device associated with a battery module to cause a voltage difference responsive to detection of an event corresponding to operation of the battery module.

19 Claims, 13 Drawing Sheets

(56) References Cited

U.S. PATENT DOCUMENTS

| | | |
|---|---|---|
| 6,873,134 B2 | 3/2005 | Canter et al. |
| 6,882,129 B2 | 4/2005 | Boskovitch et al. |
| 6,891,352 B2 * | 5/2005 | Miyazaki et al. ............. 320/118 |
| 6,933,728 B2 | 8/2005 | Kim |
| 7,061,207 B2 | 6/2006 | Patel et al. |
| 7,068,011 B2 * | 6/2006 | Yang ............................ 320/119 |
| 7,262,605 B2 * | 8/2007 | Seo et al. ...................... 324/522 |
| 7,508,166 B2 | 3/2009 | Ishikawa et al. |
| 7,598,706 B2 | 10/2009 | Koski et al. |
| 7,772,799 B2 | 8/2010 | Wu |
| 7,777,451 B2 | 8/2010 | Chang et al. |
| 7,782,013 B2 | 8/2010 | Chang |
| 7,808,207 B1 | 10/2010 | Chang |
| 7,821,227 B2 | 10/2010 | Howell |
| 7,821,231 B1 | 10/2010 | Chang et al. |
| 7,825,632 B1 | 11/2010 | Chang |
| 8,130,000 B2 * | 3/2012 | Botker et al. .................. 324/433 |
| 8,350,529 B2 * | 1/2013 | Loncarevic .................... 320/122 |
| 8,659,261 B2 * | 2/2014 | Pariseau et al. ............... 320/106 |
| 8,872,380 B2 * | 10/2014 | Shim ................................ 307/80 |
| 2004/0209161 A1 | 10/2004 | Dubac et al. |
| 2005/0029986 A1 | 2/2005 | Morgan |
| 2005/0134232 A1 * | 6/2005 | Yamamoto .................... 320/150 |
| 2005/0231169 A1 * | 10/2005 | Seo et al. ....................... 320/150 |
| 2006/0186859 A1 | 8/2006 | Fujikawa et al. |
| 2007/0018780 A1 * | 1/2007 | Furukawa et al. ............. 338/104 |
| 2008/0084182 A1 * | 4/2008 | Oberlin et al. ................. 320/116 |
| 2008/0180106 A1 | 7/2008 | Gorbold ......................... 324/434 |
| 2008/0258683 A1 * | 10/2008 | Chang ............................ 320/112 |
| 2010/0121511 A1 | 5/2010 | Onnerud |
| 2010/0253278 A1 | 10/2010 | Chang et al. |
| 2010/0315037 A1 * | 12/2010 | Aiura et al. .................... 320/107 |
| 2012/0313560 A1 * | 12/2012 | Hambitzer et al. ............ 318/139 |
| 2013/0066572 A1 * | 3/2013 | Terashima et al. .............. 702/63 |

* cited by examiner

HIGH VOLTAGE BATTERY SYSTEM FOR VEHICLE APPLICATIONS

TECHNICAL FIELD

The present disclosure is generally related to battery management systems.

BACKGROUND

FIG. 1 shows an example conventional battery system 100 (including management and control), such as for plug-in hybrid electric vehicles (PHEV) or hybrid electric vehicles (HEV). Cells are connected in parallel to form a battery set. For example, each cell possesses 3.3V for the case of lithium iron phosphorous battery cells. Sixteen (16) battery sets connected in series comprise a battery module, such as battery modules 102 (e.g., in the example of FIG. 1, assumed as each having a value of 52.8 volts (V)). Six (6) battery modules 102 connected in series (to motor 110) comprise, in this example, a portion of the battery system 100 having a cumulative voltage value of 316.8V (e.g., 52.8×6). Conventionally, each battery set of each battery module 102 is monitored and controlled directly by a vehicle electrical control unit (ECU) 104. The ECU 104 is coupled over a controlled area network (CAN) bus interface 106 to a module monitor and controller 108 associated with each battery module 102. In this example, a vast amount of data is transmitted for monitoring (e.g. voltages for each battery set) and control (e.g., battery set balancing, such as implemented by known cell balance devices that keep the battery sets balanced in capacity) as necessary. The resulting battery system 100 may become cost ineffective (e.g., complications in monitoring) and/or vulnerable to the conditions of the environment (e.g., electromagnetic interference (EMI)) that may make the electrical vehicle (EV), HEV, or PHEV unreliable.

A more advanced battery system 200 is shown in FIG. 2, where the control and monitoring of the battery system 200 is divided into master 202 and slave levels 204. The interface between the ECU 104 and the master level 202 comprises a CAN bus interface 106, whereas the interface between the master 202 and slave levels 204 comprises an RS485 interface 206, as one example among others. In this example system, most of the monitoring is dealt by slave-level control. However, data transmission is still inevitable via RS485 206 and/or CAN 106 between the master/slave and master/vehicle ECU, which may create reliability problems especially after a long service time.

SUMMARY

In one embodiment, a battery management system comprising a first circuit comprising a first plurality of circuit elements arranged in series, the first plurality of circuit elements comprising: a direct current (DC) voltage source, and first plural switching devices, each of the first plural switching devices connected to, and operably switched by, a first detection device associated with a battery module to cause a voltage difference responsive to detection of an event corresponding to operation of the battery module.

BRIEF DESCRIPTION OF THE DRAWINGS

Many aspects of the systems and methods of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are certain embodiments of a battery management (BM) system and method (collectively or individually also referred to herein as a BM system) where data transmission through communication protocols, such as RS485 or controller area network (CAN), is replaced by analog means such as voltage detection. One or more embodiments of a BM system as disclosed herein possess a highly durability to noise since all signal detection is isolated to a main high-power carrying circuit (e.g., loop) by one or more switching devices (e.g., latch relays, etc.). Hence, one or more embodiments of a BM system establish a high voltage battery system that may exhibit simplicity (e.g., easy for maintenance, and may be available as a plug-and-play architecture in view of the absence of complicated communications), reliability (e.g., durable in service life), and/or affordability (e.g., cost effective).

Though certain embodiments of BM systems are described herein in the context of use with lithium ion batteries (e.g., lithium iron phosphorous batteries), it should be understood by one having ordinary skill in the art that the applicability of the BM systems disclosed herein is not limited to any particular type of battery system and hence other types of battery systems are contemplated to be within the scope of the disclosure.

Figure 3A:
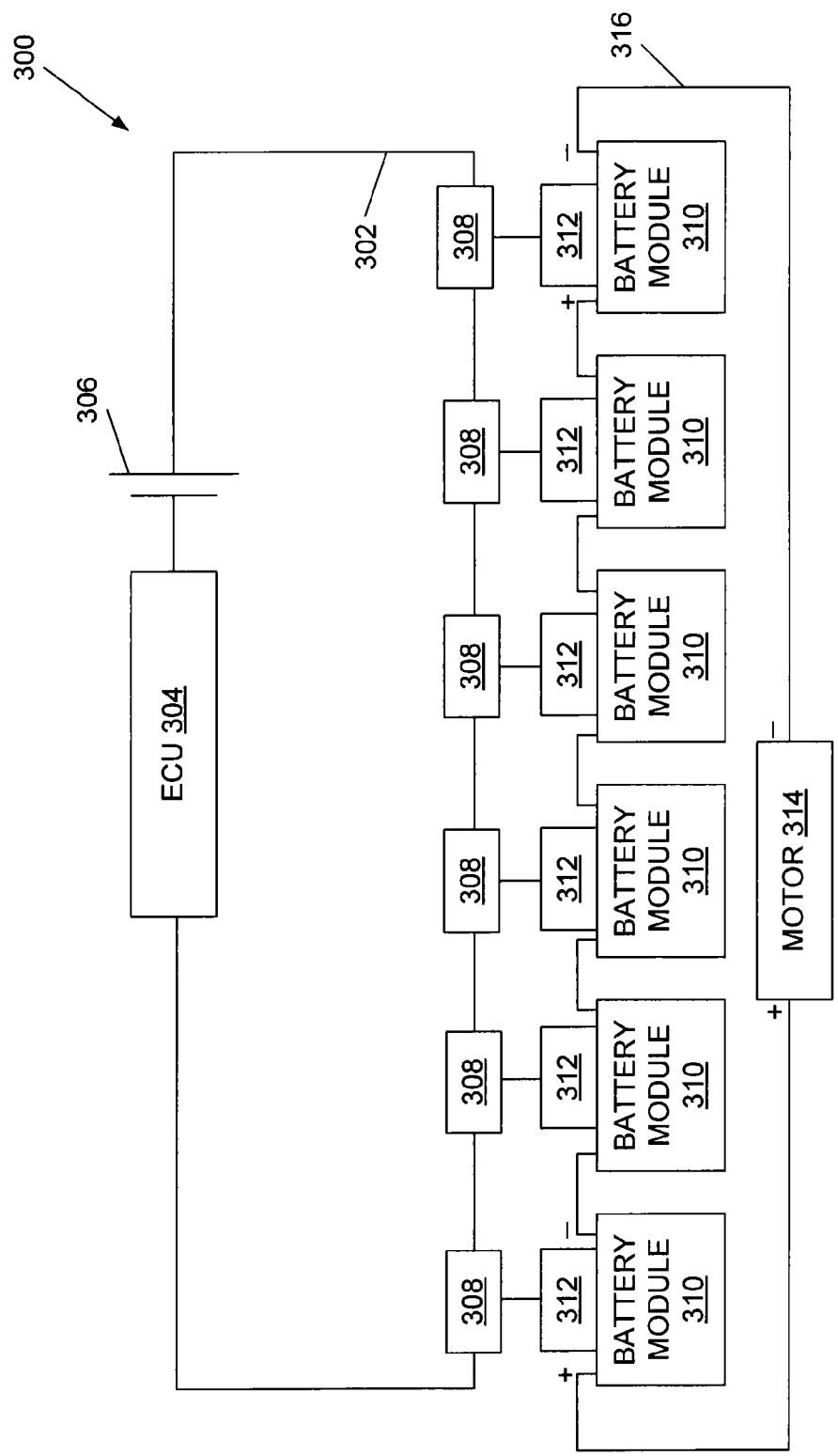
FIGS. 3A-3C are block diagrams of some embodiments of a battery management (BM) system that comprise functionality for over charge/over discharge (OC/OD) alarm detection.

Referring to FIG. 3A, shown is one embodiment of an example BM system 300. The BM system 300 comprises a first circuit 302 with circuit elements arranged in a serial manner, the circuit elements comprising a controller, such as a vehicle electrical control unit (ECU) 304, a separate, direct current (DC) voltage source 306 (e.g., 12V source, also referred to herein as a power source or 12V battery, though it should be understood that other voltage values may be used), and plural switching devices, such as switching devices 308 (referred to herein individually and collectively with reference numeral 308). The ECU 304 may comprise a resistor or resistive device for voltage difference (e.g., voltage drop or voltage increase) detection. In one embodiment, each switching device 308 may be embodied as a latching relay, which may be driven by a pulse of current that makes the associated contact open or close. For example, when a positive current is passed, the relay is opened (or closed in some embodiments), and when a negative current is passed, the relay is closed (or open in some embodiments). The open or closed position remains if the current direction is kept the same or when no current is present.

Figure 1:
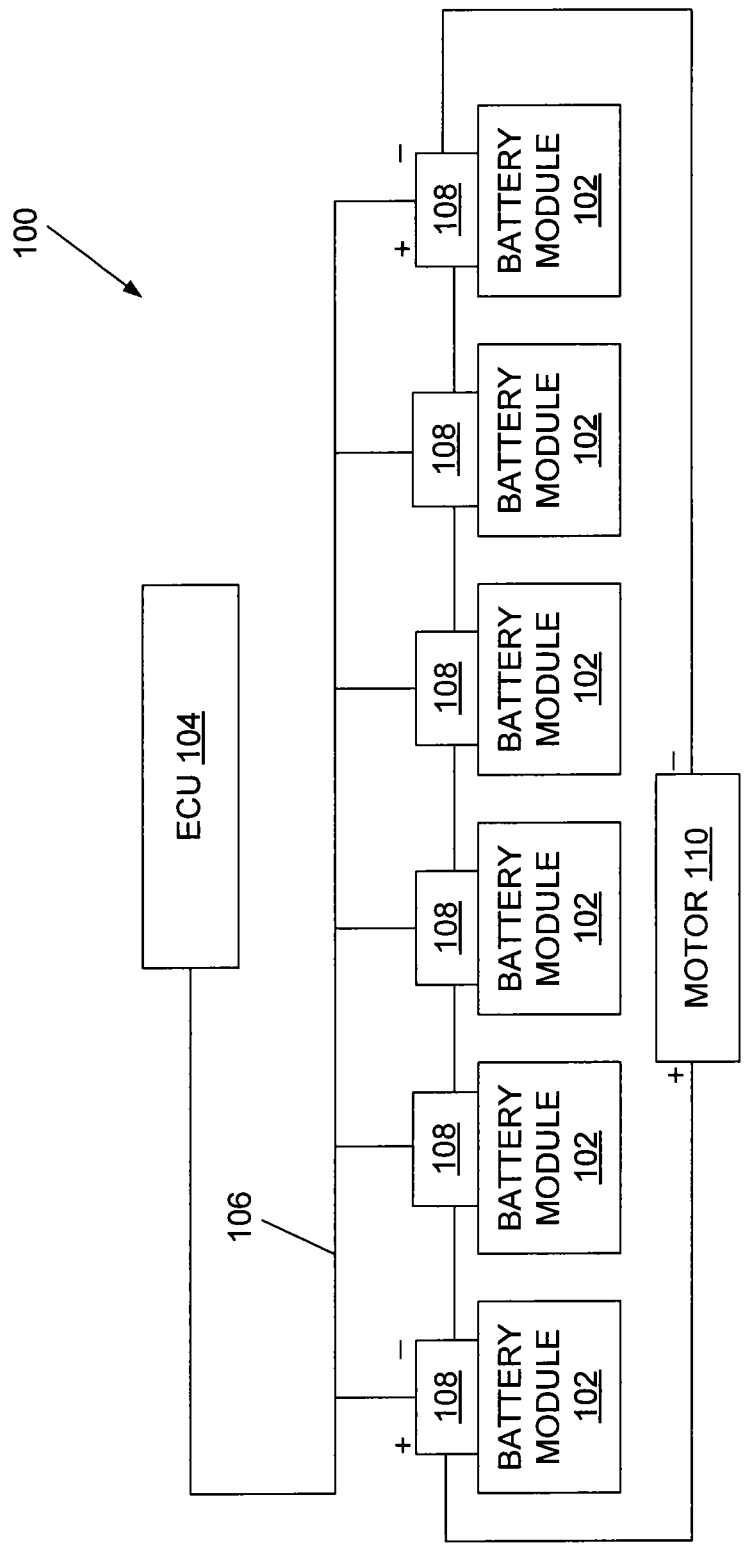
FIG. 1 is a block diagram of an example conventional battery system that includes management and control for plug-in hybrid electric vehicles (PHEV) or hybrid electric vehicles (HEV).
Figure 2:
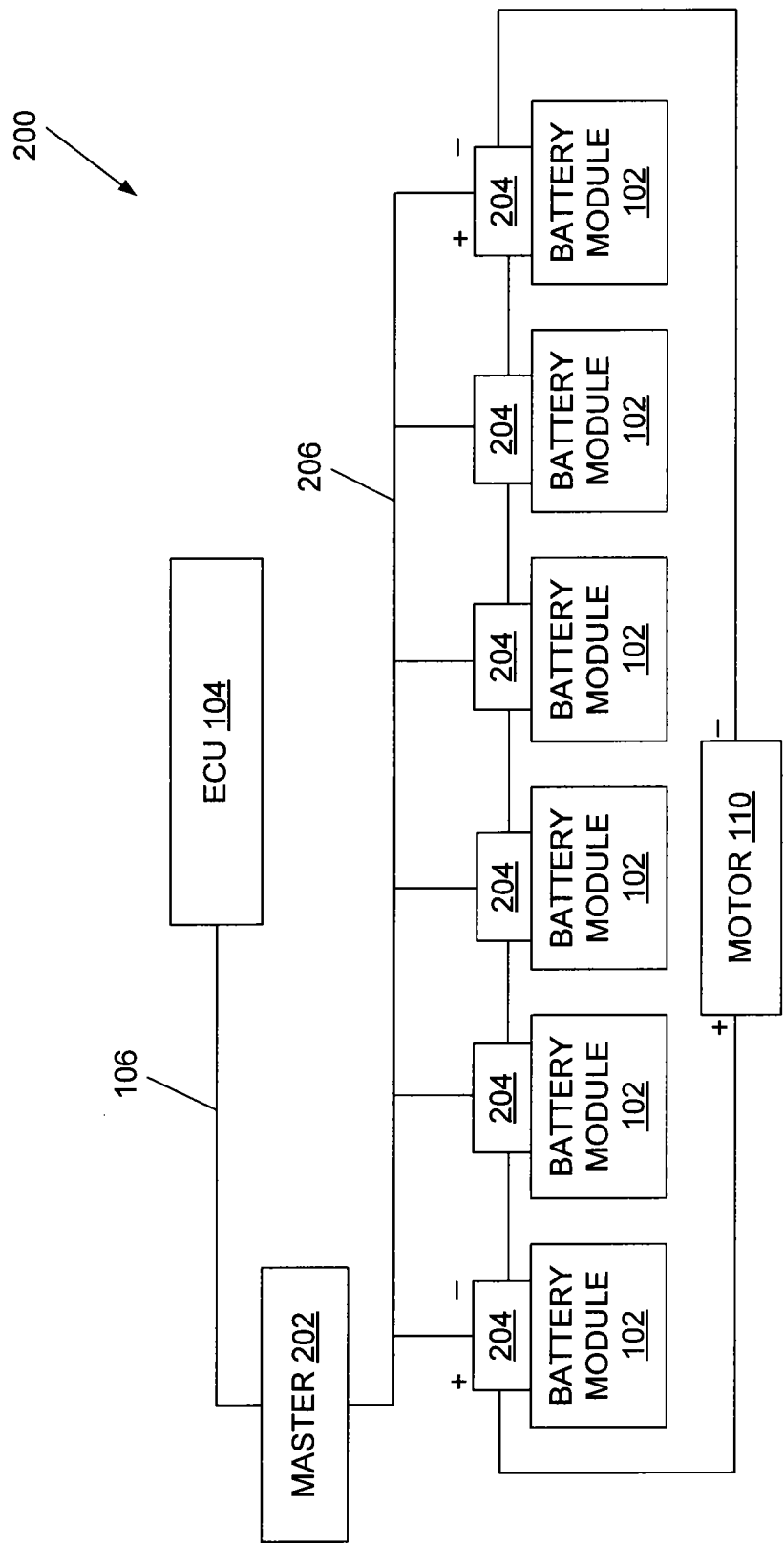
FIG. 2 is a block diagram of a more advanced, example conventional battery system created for electric vehicles (EV), HEV, or PHEV.

Associated with each of the switching devices 308 is a battery module, such as battery modules 310. The battery modules 310 may be of a similar configuration as that described in association with FIGS. 1 and 2, and in the example depicted in FIG. 3A, may comprise a voltage value of 52.8 volts (V), though other voltage values are contemplated. Each of the battery modules 310 depicted in FIG. 3A are of the same or similar configuration, and are connected in series with each other and to a motor 314 in a series loop 316.

Each battery module 310 powers (e.g., exclusively) one or more detection devices, such as detection devices 312. Each detection device 312 is connected to the respective switching device 308. In one embodiment, the detection device 312 may be an over charge/over discharge (OC/OD) detection device, which as the name implies, provides for charge/over discharge alarm detection. In some embodiments, the OC/OD device 312 may be replaced with another types, or types, of detection devices. Each OC/OD detection device 312 is used to monitor the voltages of each battery set connected (e.g., in series) within each battery module 310. For instance, in one embodiment, four (4) or eight (8) channels may be available in the monitoring function, although other quantities may be involved in some embodiments. In the case of eight (8) channels, eight (8) channels uses a total of nine (9) cables (e.g., though in some embodiments, a wireless configuration may be used) to detect the voltages of eight (8) cells or eight (8) battery sets connected in series. If any of the channels exceeds (or declines below) a given threshold (e.g., over charge or over discharge threshold), a voltage is provided by the OC/OD detection device 312 to the switching device 308 to drive the switching device open or close. In some cases, a reset current may be used to reset the over charge/over discharge boards (e.g., the OC/OD detection device 312) if a switching device 308 was opened previously. In other cases, if a known automatic resume function is available, then no reset activity (passing a reset current) should be necessary.

Each of the switching devices 308 in the circuit 302 (e.g., loop) is controlled by an associated "parasitic" detection device, such as the OC/OD detection device 312, and each battery module 310 may be implemented in some embodiments with one or more parasitic devices. Parasitic refers herein to the absence of ECU control (i.e., no ECU control is needed) and, in one embodiment, such parasitic devices are only powered by the batteries in the battery module 310. The parasitic devices may generate alarm signals to the ECU 304. As is explained in further detail below, examples of parasitic devices include, without limitation, the OC/OD detection devices 312, cell balancing devices, and temperature monitoring devices. Since the switching device 308 behaves as an electrical isolator, the 12V loop circuit 302 is isolated from the battery modules 310 connected in series, and thus no noise interference through each of the battery modules 310 is possible. In the example depicted in FIG. 3A, the ECU 304 detects the voltage drop of the circuit 302. In other words, if any of the OC/OD detection devices 312 detects over charge or over discharge of one of the battery sets within one or more of the modules 310, the connected switching device 308 is triggered open by the detecting OC/OD detection device 312. The ECU 304 responsively detects a voltage drop from, in this example, 12V 0V from the voltage source 306 if any of the switching devices 308 is triggered open.

Figure 3B:
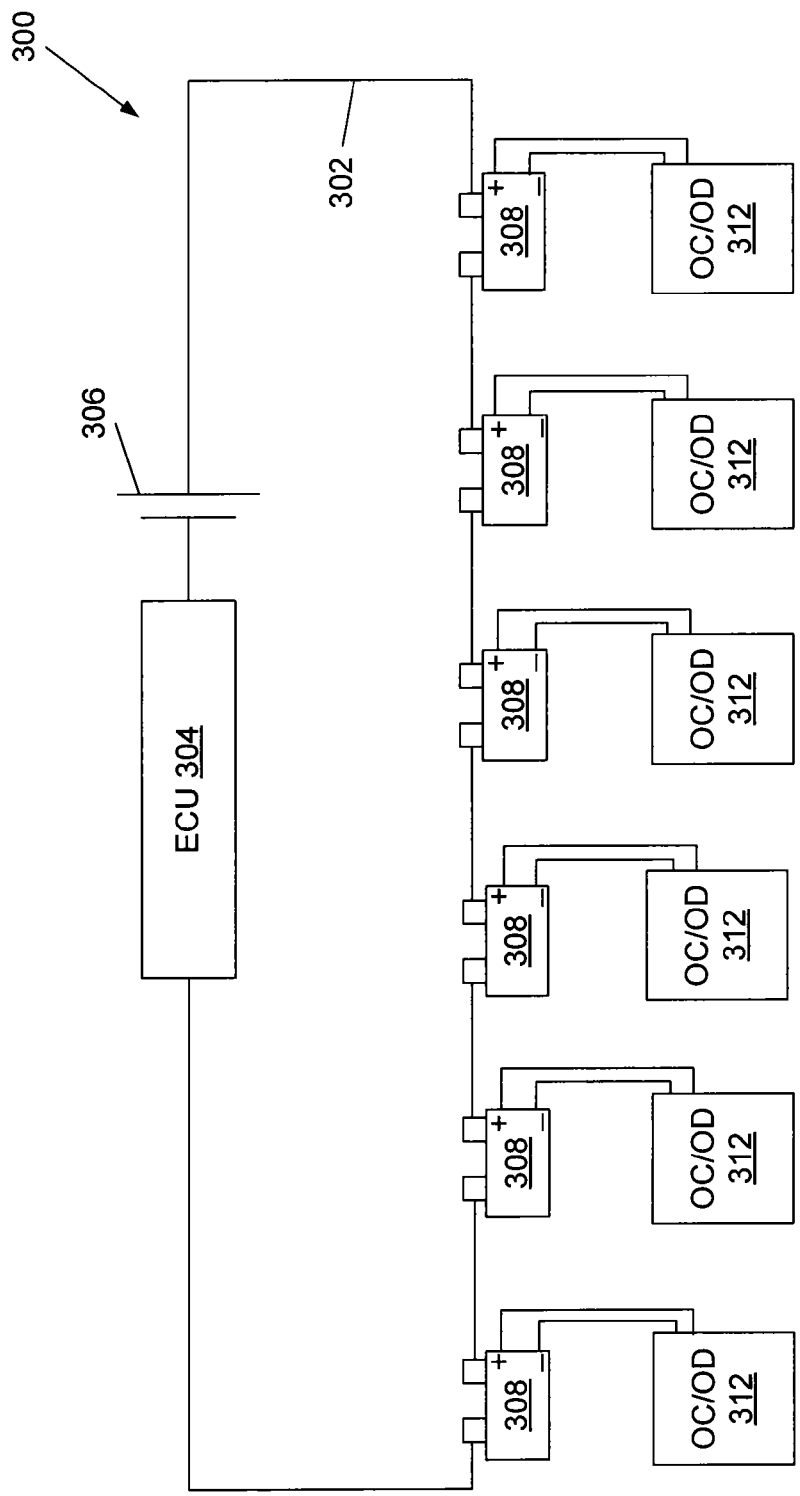

FIG. 3B provides a more detailed view of at least a portion of the BM system 300 shown in FIG. 3A, and like reference numerals correspond to features that are the same or similar to those found in FIG. 3A and hence description of the same is omitted here except where noted below. In particular, the OC/OD detection device 312 may be embodied as a logic board that is connected across terminals (represented with "+" and "−" in the switching device 308 of FIG. 3B (the battery module 310 omitted for clarity). Further, the switching device 308 may comprise a two-terminal latch relay as shown, with each switching device 308 coupled to another via the terminals. Note that in some embodiments, other configurations for the switching device 308 may be used.

Figure 3C:
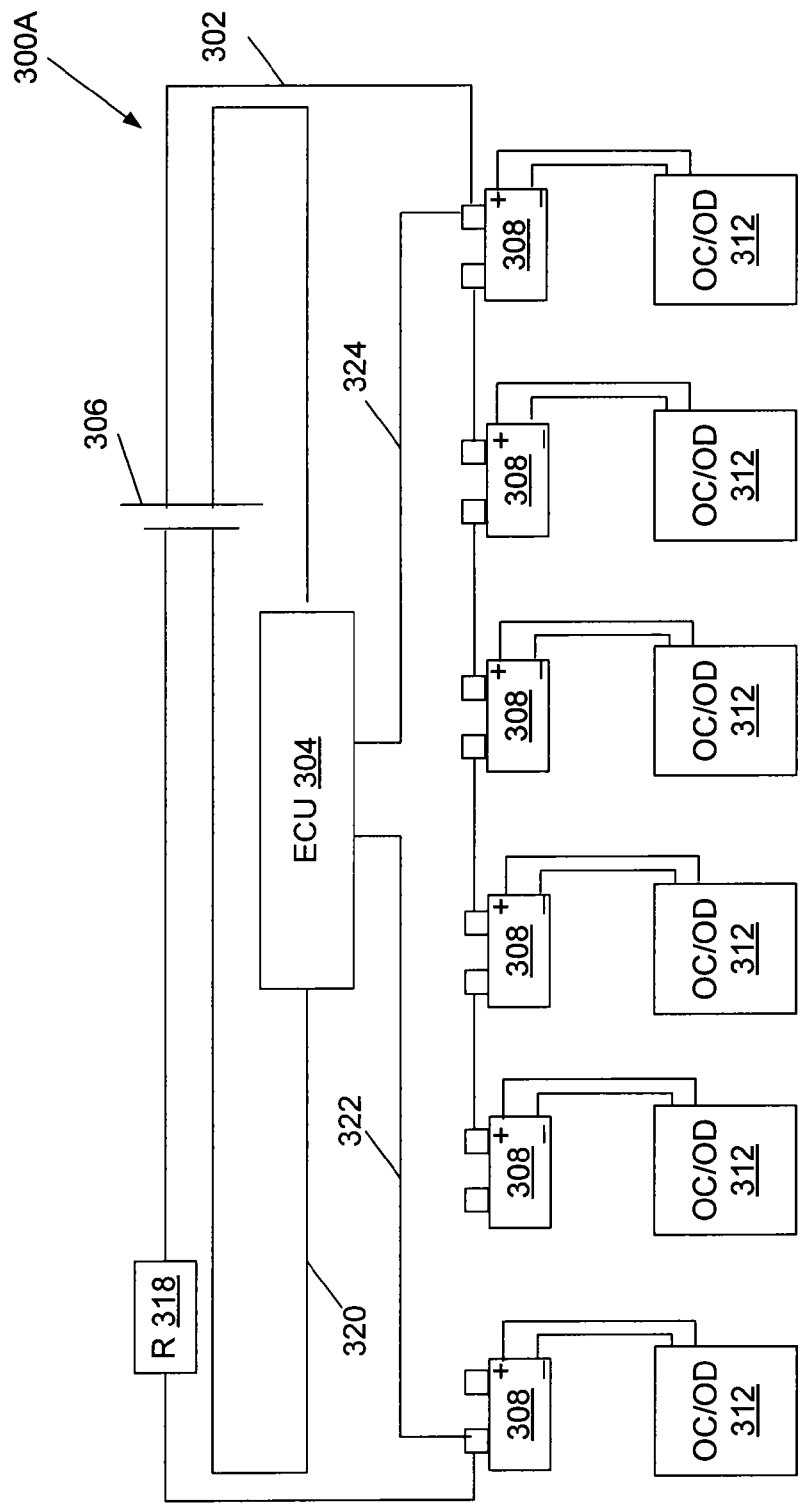

FIG. 3C comprises another BM system embodiment that is a variation of the embodiment shown in FIG. 3B. In the case of the BM system 300A shown in FIG. 3C, the power source 306 and the switching devices 308 and resistor 318 are connected in series in the circuit 302. The ECU 304 is powered by the 12V battery 306 separately, according to circuit 320.

Connections 322 and 324 between the switching devices 308 and the ECU 304 (e.g., between the ECU 304 and the first switching device 308 shown at the extreme left hand side of FIG. 3C, and between the ECU 304 and the last switching device 308 shown at the extreme right hand side of FIG. 3C) are thus used for voltage detection only. In this case, when all switching devices 308 are closed, no voltage difference should be detected by the ECU 304 (all will be at 12V). Only when one of the switching devices 308 opens is a 12V voltage difference detected by the ECU 304. The voltage difference detected by ECU 304 is different from this case to earlier cases described in FIGS. 3A and 3B (a drop in voltage from 12V to 0V).

Figure 4:
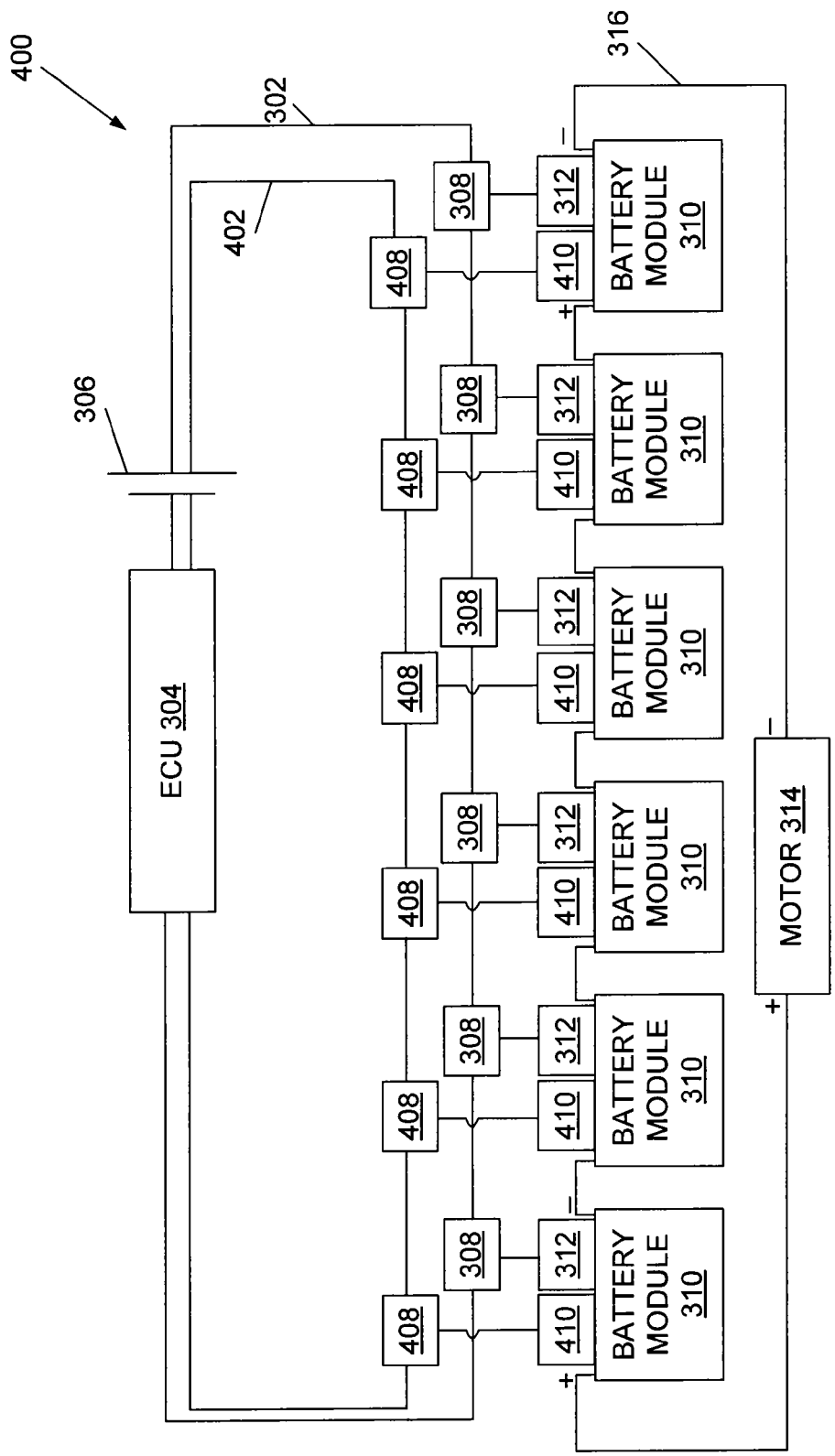
FIG. 4 is a block diagram of another embodiment of a BM system that comprises functionality for both OC/OD alarm detection and temperature monitoring, the latter according to a second loop using the same power source as that used for OC/OV alarm detection.

Referring now to FIG. 4, shown is another embodiment of a BM system 400. Similar to the embodiment described in association with FIGS. 3A-3B, the BM system 400 comprises a circuit 302 (e.g., loop) comprising a plurality of circuit elements arranged in series, including the ECU 304, voltage source 306, and plural switching devices 308. Each switching device 308 is connected to, and operably switched by, the OC/OD detection device 312, which is powered (e.g., exclusively in some embodiments) by the associated battery module 310. Operation of these components are as described in association with FIGS. 3A-3B, and hence discussion of the same is omitted here except as noted below. The BM system 400 further comprises a second circuit 402 (e.g., loop) comprising a plurality of circuit elements also arranged in series, including the ECU 304, the voltage source 306, and plural switching devices 408 of the same or similar configuration as the switching devices 308. Each switching device 408 is connected to, and operably switched by, a detection device 410, the detection device 410 powered (e.g., exclusively) by the associated battery module 310. In the embodiment depicted in FIG. 4, the detection device 410 is embodied as a temperature monitoring device. In some embodiments, a different type of detection device may be used in place of either the detection devices 312 and 410, and/or additional detection devices may be used (e.g., with in some embodiments, a corresponding increase in circuits, configured similar to circuit 402). The temperature monitoring device 410 works in the same or similar manner as the OC/OD detection device 312, except the temperature monitoring device senses temperature of the battery module 310.

Using a similar method to that employed for OC/OD monitoring, the temperature monitoring device 410 may be implemented in a separate circuit (e.g., the circuit 402 as compared to circuit 302) yet use the same voltage source 306. If any of the switching devices 408 of the circuit 402 is triggered by the temperature monitoring device 410, the ECU 304 detects a voltage difference according to the voltage across the source 306 (e.g., 12V in this example). Using the circuits 302 and 402 and corresponding circuit elements, the ECU 304 is able to identify the event (e.g., overcharge or over discharge, excessive temperature) that is detected by either the OC/OD detection devices 312 or the over temperature monitoring devices 410. Note that although two circuits (e.g., loops) are illustrated in FIG. 4, it should be understood that additional circuits (e.g., similar to circuit 402) may be added for detection of additional events (e.g., misbalance, etc.) corresponding to the operation of the battery module or other (e.g., environmental) conditions. For instance, in some embodiments, cell balance devices may be employed (e.g., in lieu of the temperature monitoring or in addition to temperature monitoring), the cell devices used in keeping the battery sets balanced in capacity.

Note that the ECU 304 (or other controller, such as a controller board as described below) may be configured in some embodiments to carry out one or more of the following functions: accept an alarm for overcharge/over discharge of the battery sets; accept an alarm for over temperature of the battery modules; provide control of the switching devices implemented in the circuit that carries high power (the number of switching devices needed depending, for instance, on the safety considerations and can be configured with one or more, such as one for every battery module 310; and optionally, control of fans implemented for each of the battery modules 310.

Further, in one embodiment, the outputs generated by the battery modules 310 may include one or more of the following: the alarm signal of over charge or over discharge; the alarm signal of over temperature.

Figure 5A:
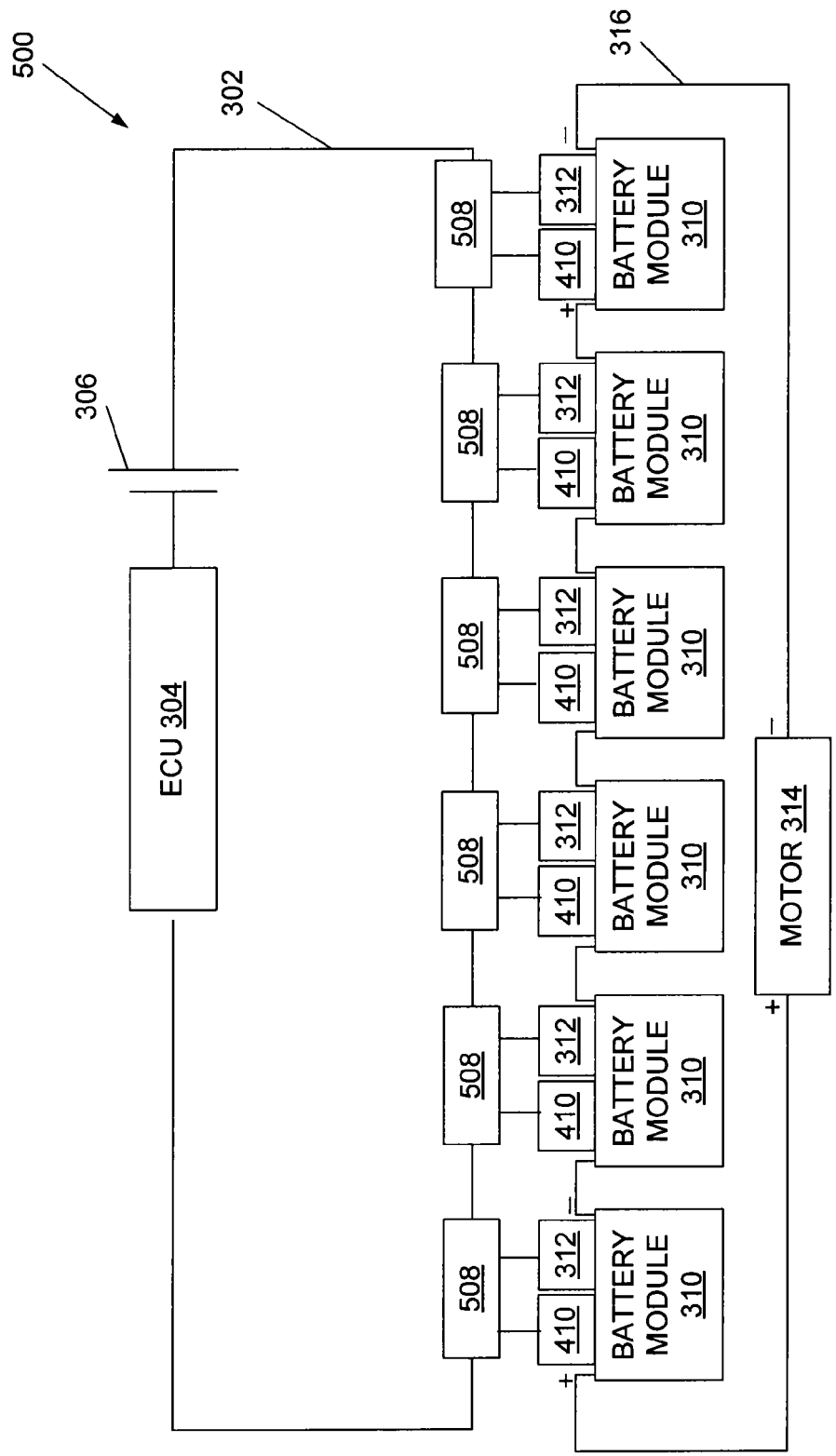
FIG. 5A is a block diagram of another embodiment of a BM system that comprises functionality for both OC/OD alarm detection and temperature monitoring using the same switching device, provided the electrical loops are different and isolated.
Figure 5B:
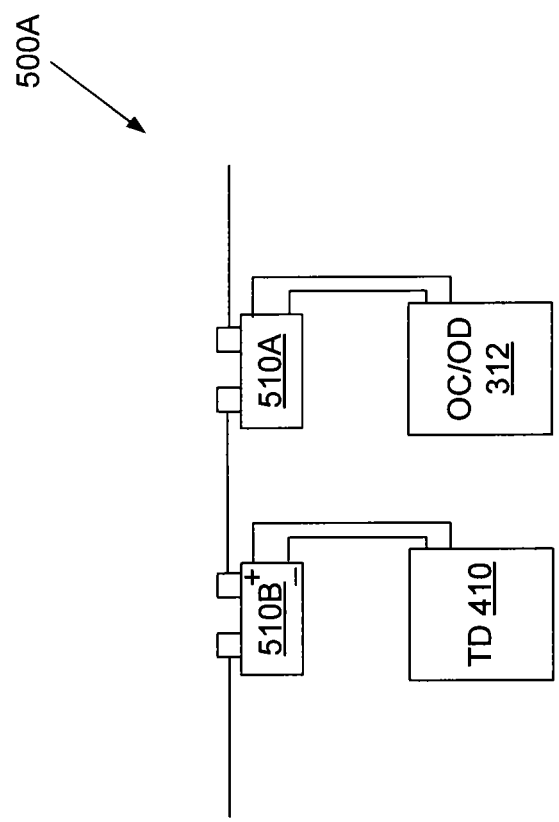
FIG. 5B is a block diagram that provides a more detailed view of a portion of the BM system illustrated in FIG. 5A.

Referring now to FIGS. 5A-5B, shown is an embodiment of a BM system 500 with a similar configuration to the BM system 300 shown in FIG. 3A. The BM system 500 comprises a circuit 302 comprising a plurality of circuit elements arranged in series, including the ECU 304, voltage source 306, and plural switching devices 508, configured in one embodiment as latching relays. Each switching device 508 is connected to both the OC/OD detection device 312 and temperature monitoring device 410, the devices 312 and 410 powered by the associated battery module 310. In other words, the OC/OD detection device 312 and the temperature monitoring device 410 are both coupled to (and actuate) the same switching device 508 (e.g., provided the electrical loops are different and isolated—in other words, the temperature monitoring device 410 and the OC/OD detection device 312 are connected to the switching device 508 separately). In some embodiments, such as the embodiment 500A depicted partially in FIG. 5B (with the understanding that other components are similar to that shown in FIG. 5A), the switching device 508 may be replaced by two switching devices 510A, 510B (e.g., latch relays). Thus, the switching device 510A is connected to the OC/OD detection device 312 and the switching device 510B is connected to the temperature monitoring device (TD) 410, with the switching terminals of the switching devices 510A, 510B (not seen in FIG. 5A) connected in series as shown in FIG. 5B. In one example operation, if any of the switching devices 508 as shown in FIG. 5A (or devices 510A, 510B as illustrated in FIG. 5B) is triggered open by the OC/OD detection device 312 or the temperature monitoring device 410, the ECU 304 detects a 12V voltage drop difference. Thus, the ECU 304 "knows" that events (e.g., problems) are developed by the battery system 500, though the exact reason may be unknown.

Figure 6:
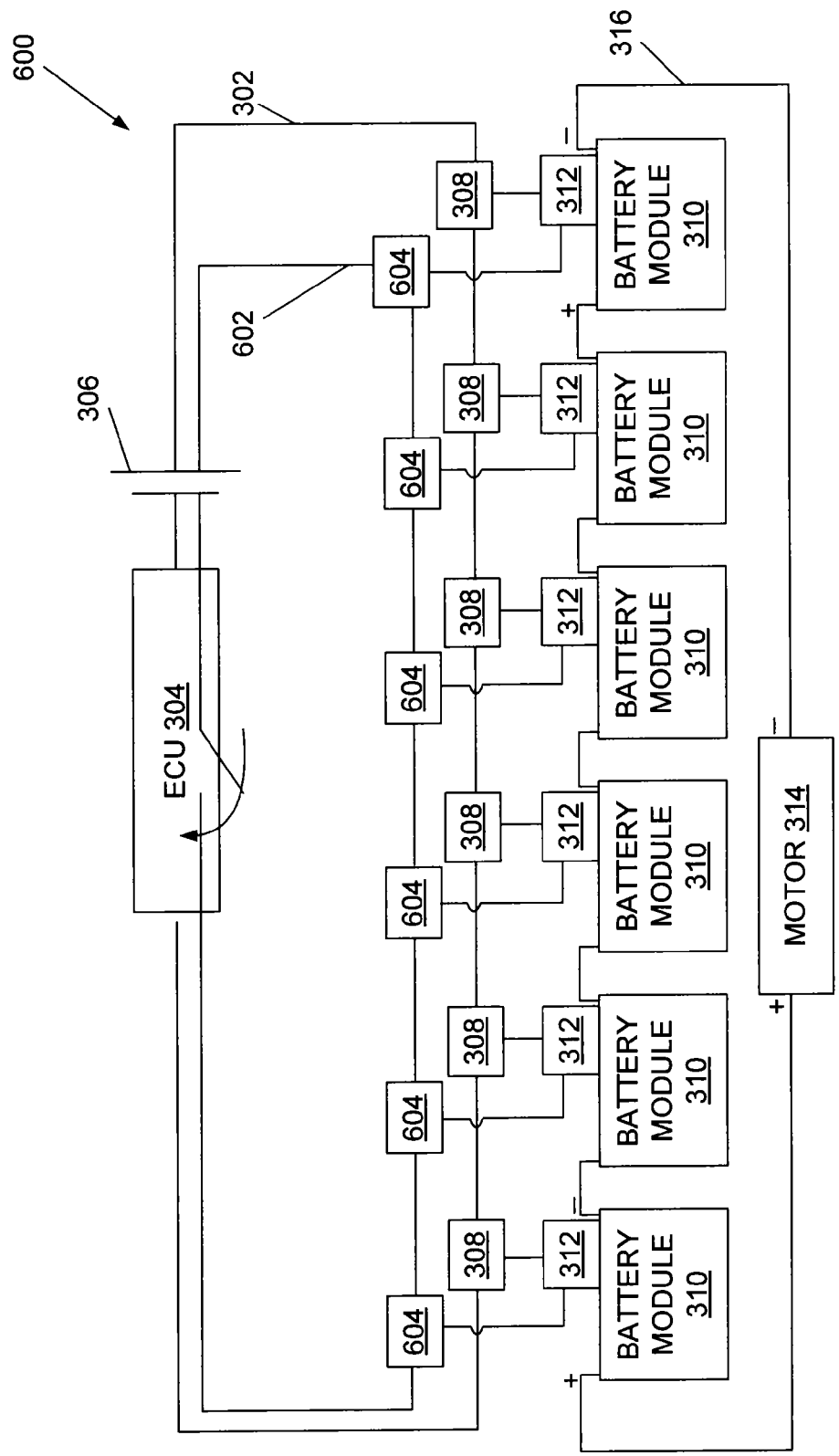
FIG. 6 is a block diagram of another embodiment of a BM system that arranges the switching devices in the reverse direction when compared to some of the other disclosed embodiments.

Attention is now directed to FIG. 6, which illustrates an embodiment of a BM system 600 where the switching devices of one circuit are connected in normal order (e.g., in the manner as previously described) and the switching devices of another circuit are connected in reverse order. In particular, the BM system 600 comprises a serial circuit 302 comprising a plurality of circuit elements as described above, including the ECU 304, the voltage source 306, and the plural switching devices 308. Each switching device 308 is connected to an OC/OD detection device 312, which is powered by an associated battery module 310. The BM system 600 comprises another serial circuit 602, having a normally-open circuit configuration, the circuit 602 comprising the ECU 304, the voltage source 306, and plural switching devices 604 (e.g., latch relays), with each switching device 604 connected to the OC/OD detection device 312. Thus, unlike previous embodiments, the operation of switching device 604 is reversed by arranging the switching devices 604 in the reverse direction (to be triggered by the ECU 304). When the circuit 602 is closed by the ECU 304 (or in some embodiments, closed manually), all switching devices 604 are triggered closed at the operational ends. Such operation as illustrated in FIG. 6 may be used, for example, in resetting the OC/OD detection devices 312 (or temperature monitoring devices 410 when employed, such as in the configuration shown in FIGS. 4, 5A, or 5B) when one of the switching devices 308 (only) was opened previously by the OC/OD detection device 312 or the temperature monitoring device 410.

Figure 7A:
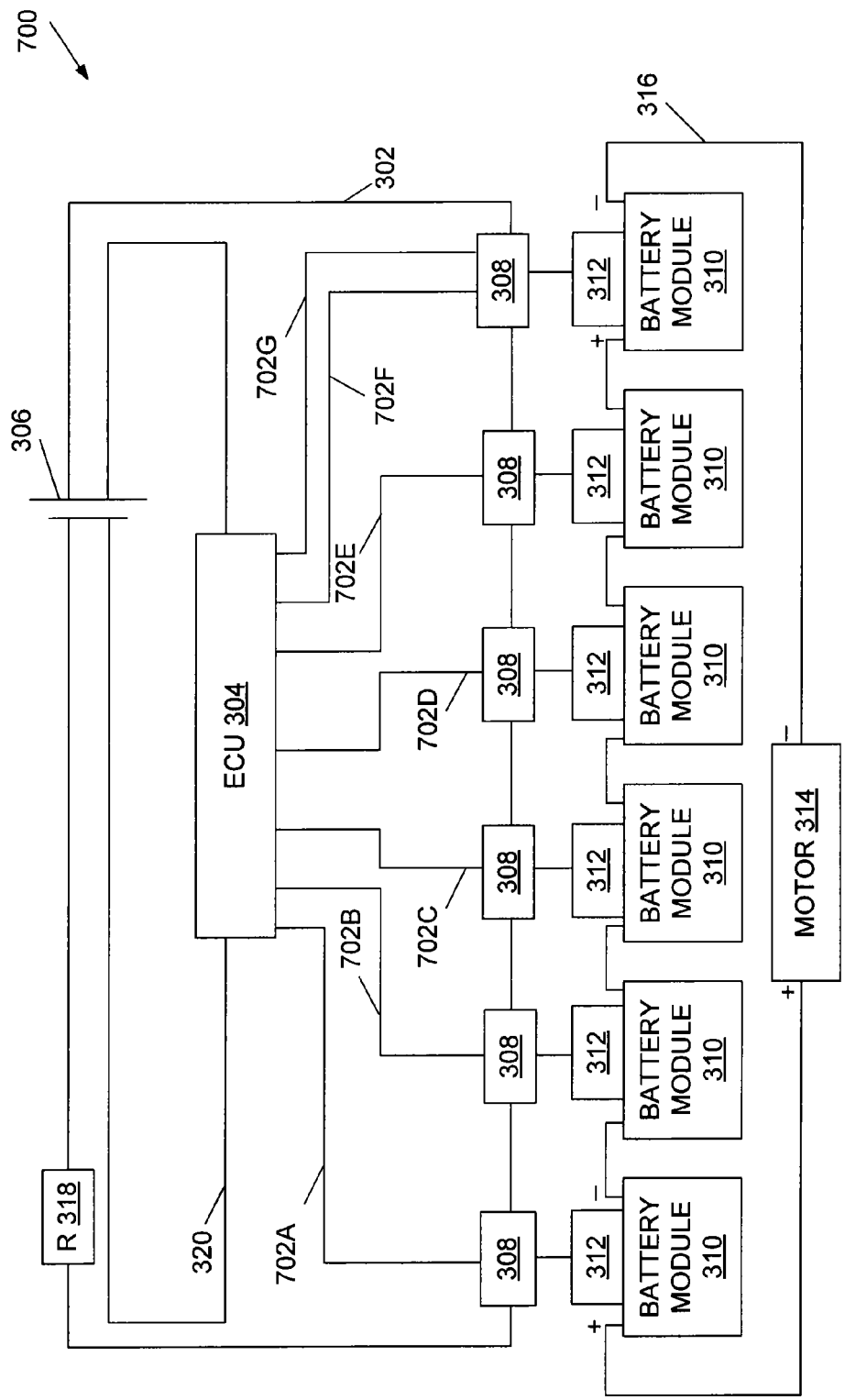
FIGS. 7A and 7B are block diagrams of another embodiment of a BM system with cables connected between each of the switching devices and a control unit, enabling the control unit to detect which switching device is open by monitoring the voltage difference between each switching device.

FIG. 7A illustrates another embodiment of a BM system 700, with similar circuit elements to those previously described in association with, and shown in, FIG. 3C, as noted by like reference numerals, and hence discussion of the same is omitted for brevity. In other words, the control unit 304 is used in detecting the voltage difference generated responsive to opening of the switching device 308. Further, the control unit 304 is powered by a separate circuit (e.g., circuit 320 versus circuit 302). Thus, whereas in FIG. 3A the control unit 304 is powered by and sensing with the same circuit 302, in FIG. 3C (and applicable here in FIG. 7A), the control unit 304 is powered by one circuit 320 and is used in sensing another circuit 302. Further, wherein FIG. 3C illustrates an embodiment where a voltage difference (e.g., voltage drop) is detected by detecting a voltage difference from a voltage corresponding to the voltage source 306 to (approximately) zero responsive to detection of the voltage difference between the first and the last switching devices, FIG. 7A goes further in its identification of the switching device 308 as explained below.

Figure 7B:
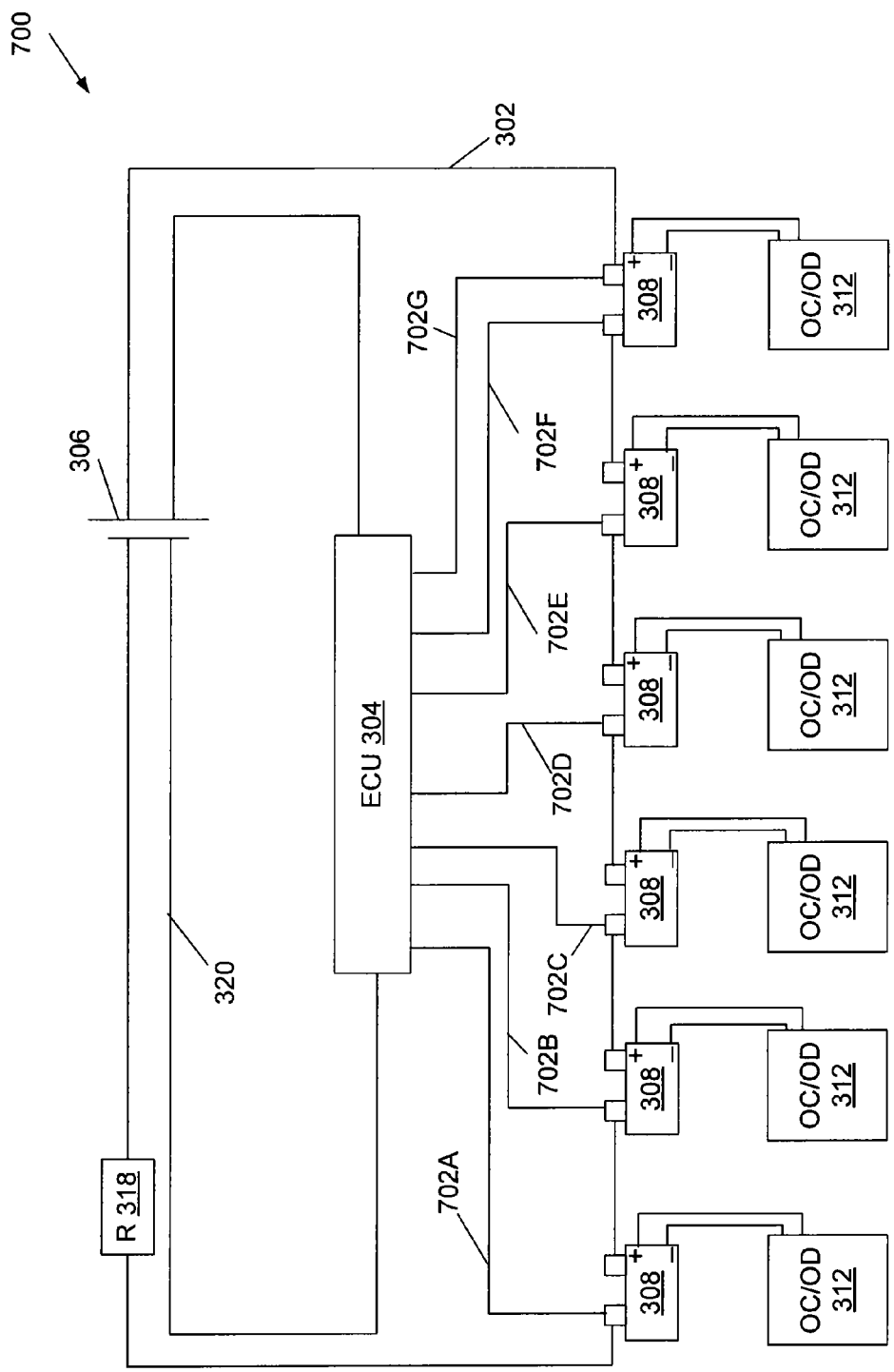

The BM system 700 comprises cables 702 (e.g., 702A-702G) connected between each of the switching devices 308 and the ECU 304. In such a configuration, the ECU 304 is enabled to detect which switching device 308 is open by monitoring the voltage difference between each switching device. In the example depicted in FIG. 7, six (6) switching devices 308 use seven (7) cables in total for differentiating which battery module 310 is over charged or over discharged. The ECU 304 is part of a circuit 320 that is separate from circuit 302. FIG. 7B provides a more detailed view of the embodiment depicted in FIG. 7A (with the omission of the battery module 310 for clarity), with the series connections between terminals of adjacent switching devices 308 illustrated along with the connections to the ECU 304 via the cables 702. Note that in some embodiments, the configuration of individual cables 702 as shown in FIG. 7A may be used in association with BM systems having an architecture as shown in FIGS. 3A and 3B.

Figure 8:
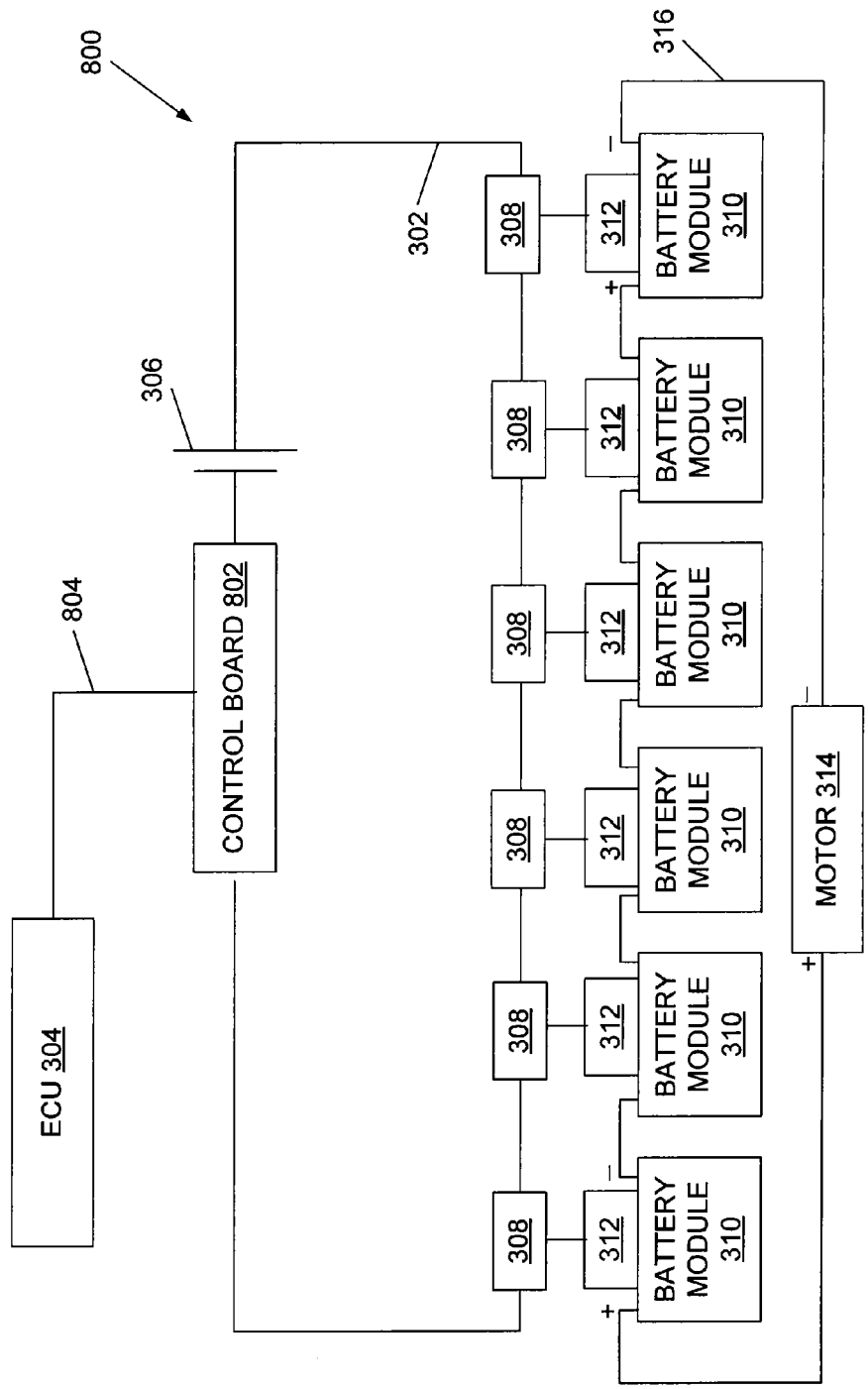
FIG. 8 is a block diagram of another embodiment of a BM system where the control unit is configured as an intermediate PCB that works the same way as the ECU described in other embodiments, enabling the BM system to be controller area network (CAN)-ready.

In FIG. 8, another BM system embodiment 800 is illustrated, with a similar circuit arrangement to that shown in FIG. 3A, including the serial arrangement in circuit 302 of circuit elements that include the voltage source 306 and switching devices 308, each switching device 308 connected to the OC/OD detection device 312 associated with the battery module 310. In addition, the circuit 302 comprises a controller board 802, which is coupled over a CAN bus interface 804 to the ECU 304. In other words, the ECU 304 may be replaced by an intermediate printed circuit board (PCB) that works in the same (or similar) way as the ECU 304 described above. One advantage of this arrangement is that the battery system 800 may be CAN interface-ready and hence is ready to be connected to any existing ECUs.

Note that in some embodiments, the 12V voltage source 306 used as an example throughout the disclosure may be replaced by batteries other than 12V if the current flowing through the circuit (e.g., 302) that connects the switching devices (e.g., 308) is sustainable. In some embodiments, the 12V voltage source 306 may be connected to a converter that converts high voltage (e.g. 316.8V) down to 12V, provided normal operation of the ECU 304 is unaffected (e.g., to any significant degree).

In some embodiments, a light-emitting diode (LED) may be included in series with a resistor and connected across each of the terminals of the switching devices (e.g., 308, the two terminals illustrated more clearly in FIG. 3B or FIG. 3C or FIG. 7B). When any of the switching devices opens, the LED light is energized (e.g., turned-on) because of the voltage difference generated between the switching device terminals. The LED may be used as an indication of which battery module 310 is generating the event (e.g., problem). If one more LEDs is implemented across a switching device for the temperature monitoring device 410 (e.g., see FIG. 4, FIG. 5A, FIG. 5B), then the identification of which module 310 possesses a problem is enabled (e.g., either over temperature or over charge/over discharge). In some embodiments, the LED may be replaced with an audio device (e.g., buzzer) or any devices that may be used in identifying which problem is generated by which module 310.

In certain embodiments of BM systems described herein, it is noted that the ECU 304 does not need to know all details of activities of each battery set. For example, the ECU 304 is concerned with activities to be taken when alarm signals are generated by the battery modules 310. From this perspective, complicated communications between the battery modules may be replaced by simple mechanical signals, such as voltages, and thus may be very reliable for long service life and also free from noises coming from an inverter, motor, or a high voltage-low voltage converter, among other sources of noise. In other words, the functions for the ECU 304 and the battery modules 310 described above are important for a high voltage battery system. However, in some embodiments, more sophisticated functions may be employed as well. Similarly, in some BM system embodiments, some functions described above may be omitted, and/or in some embodiments, features shown and described in association with the above-described figures may be mixed and matched.

Having described various embodiments of BM systems, some example implementations are described below to illustrate the utility of certain BM systems. In an example employing a BM system in an electric vehicle (EV), the following is assumed: (a) three (3) 18Ah cells are connected in parallel to form a 54Ah battery set; (b) sixteen (16) sets are connected in series to form a battery module (e.g., module 310); (c) six (6) battery modules are connected in series to form a battery system (similar to the arrangement illustrated in, for instance, FIG. 4); (d) for each of the battery modules, two 8-channel OC/OD detection devices (e.g., boards), four 4-channel balance boards, and one 8-channel temperature monitoring device (e.g., board) are installed (as mentioned earlier, all these detection devices are considered parasitic); (e) all switching devices connected to the OC/OD detection boards are connected in series, forming a first circuit or loop (e.g., with a total of twelve (12) switching devices); and (f) all switching devices connected to the temperature monitoring boards are connected in another series that forms a second loop (a total of six (6) switching devices). In this example, a BM system similar to the BM system 400, FIG. 4, may be employed.

Now referring to an example operation, during driving, when any of the battery sets of one or more modules (e.g., 310) is low in voltage, an over discharge signal is generated by the associated OC/OD detection board. As a consequence, the switching device connected to the OC/OD detection board is opened, and responsively, the ECU detects a voltage difference from 12V to 0V and the ECU starts limiting the current to a motor until the vehicle is parked safely.

During charging, when any of the battery sets is high in voltage, an over charge signal is generated by the OC/OD detection board. As a consequence, the switching device connected to the OC/OD detection board is opened, and responsively, the ECU detects a voltage difference from 12V to 0V and the ECU starts limiting the charge current until the OC/OD detection board is resumed and the switching device connected to the OC/OD detection board closes again. The same activity is repeated until a preset charging voltage (e.g. 340V) is achieved. For instance, the charger may be resumed at a lower voltage (e.g. 318V) until the charger is removed from the vehicle.

In another example, such as for a BM system employed in a PHEV, the following is assumed: (a) three (3)18Ah cells are connected in parallel to form a 54Ah battery set; (b) sixteen (16) sets are connected in series to form a battery module; (c) six (6) battery modules are connected in series to form a battery system; (d) in each of the battery modules, two 8-channel OC/OD detection boards, four 4-channel balance boards, and one 8-channel temperature monitoring board are installed (as mentioned earlier, all these devices are parasitic); (e) all switching devices connected to the OC/OD detection boards are connected in series to form a first loop (e.g., a total of twelve (12) switching devices); and (f) all switching devices connected to the temperature monitoring boards are connected in another series that forms a second loop (e.g., a total of six (6) relays). In this example, a BM system similar to the BM system 700, FIGS. 7A-7B, may be employed for the detection of the battery module generating events (e.g., problems).

In one example operation, during driving, when any of the battery sets is low in voltage, an over discharge signal is generated by the OC/OD detection board. As a consequence, the switching device connected to the OC/OD detection board is opened, and responsively, the ECU detects a voltage difference from 0V to 12V and thus starts a genset (e.g., diesel electric generator) for recharging the battery system. The ECU may be further configured to present for display "maintenance required" on a screen of a display device once such problem is generated frequently when overall battery system is still high but the same module keeps showing over discharge problems.

During charging, when any of the battery sets is high in voltage, an over charge signal is generated by the OC/OD detection board. As a consequence, the switching device connected to the OC/OD detection board is opened. At this moment, the ECU detects a voltage difference from 0V to 12V and the ECU starts limiting the charging current either coming from the genset or the charger until the over OC/OD detection board is resumed and the switching device connected to the over OC/OD detection board closes again.

If the vehicle is "ON", that means the charging is coming from the genset, so the genset is not triggered until the next time there is a condition of low in battery capacity (which may be monitored through a state of charge (SOC) monitor or through the determination of the battery system voltage). If the vehicle is in an "OFF" mode, the same charging activity may be repeated until a preset charging voltage (e.g. 340V) is achieved. For instance, the charger is resumed at a lower voltage (e.g. 318V) until the charger is removed from the vehicle. The ECU may be further designed to show "maintenance required" once such problem is generated frequently when overall battery system is still low but the same module keeps showing over charge problems. It should be noticed that all the functions' design can be conducted by the ECU, which may not be directly related to the battery system itself in some embodiments.

The examples described above are useful in demonstrating that certain BM system embodiments may work well for high voltage applications, such as in EV, PHEV, or HEV. It should be understood that certain BM system embodiments may be applicable to any applications that need high voltages, that possess several battery modules connected in series, and that require an ECU or PLC (or other) control for the applications.

Figure 9:
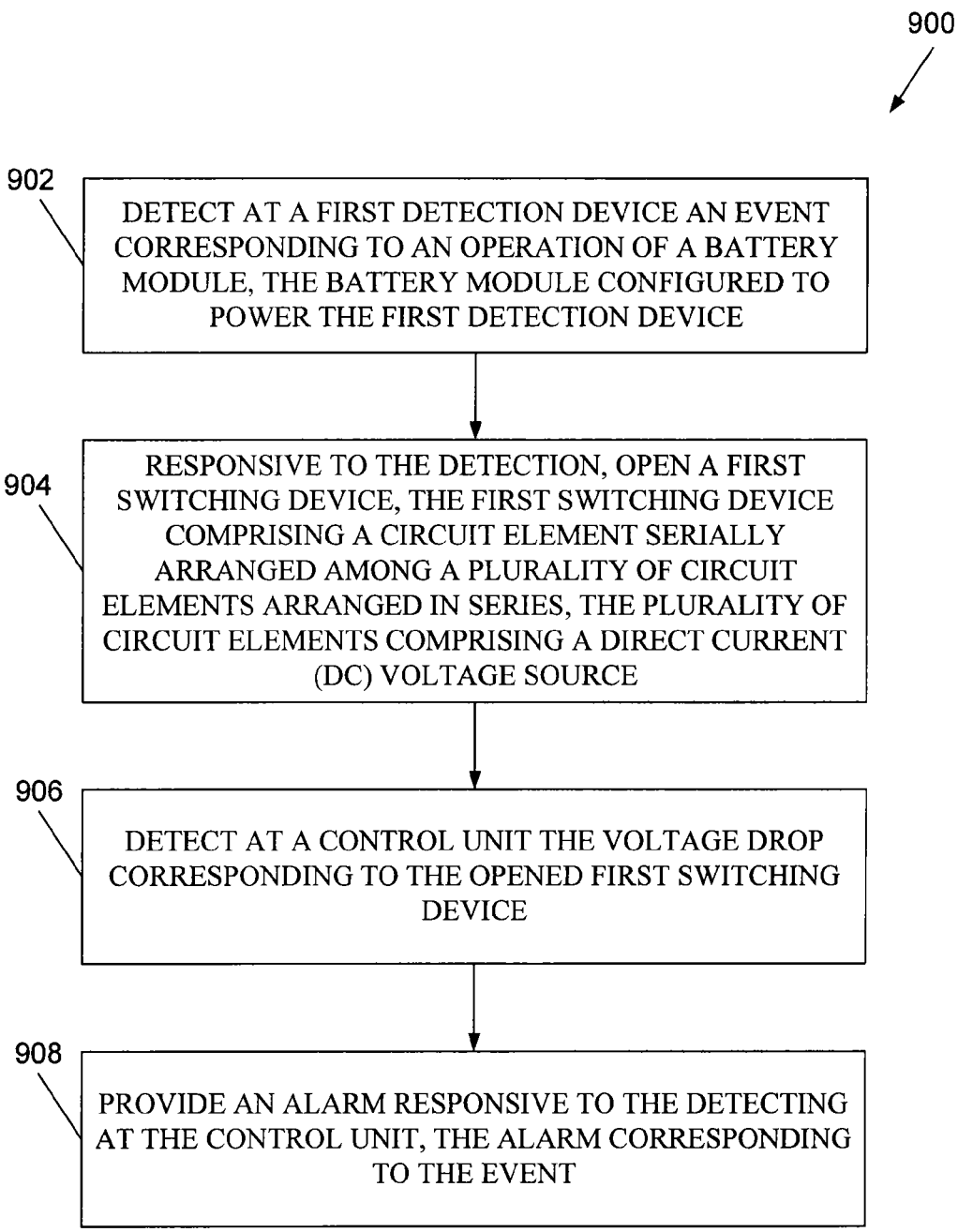
FIG. 9 is a flow diagram of an embodiment of an example BM method.

In view of the above-description of certain embodiments of BM systems, it should be appreciated that one method embodiment, depicted in FIG. 9 and referred to as BM method 900, comprises detecting at a first detection device an event corresponding to an operation of a battery module, the battery module configured to power the first detection device (902); responsive to the detecting, opening a first switching device, the first switching device comprising a circuit element serially arranged among a plurality of circuit elements arranged in series, the plurality of circuit elements comprising a direct current (DC) voltage source (904); detecting at a control unit the voltage difference corresponding to the opened first switching device (906); and providing an alarm responsive to the detecting at the control unit, the alarm corresponding to the event (908).

Note that alternate implementations may be included within the scope of the disclosure, in which functions may be executed out of order from that shown or discussed in association with FIG. 9, including substantially concurrently or in reverse order, depending on the functionality involved, as would be understood by those reasonably skilled in the art.

It should be emphasized that the above-described embodiments of the present disclosure are merely possible examples of implementations, merely set forth for a clear understanding of the principles of the BM system and method embodiments. Many variations and modifications may be made to the above-described embodiment(s) without departing substantially in spirit and principles. All such modifications and variations are intended to be included herein within the scope of this disclosure and protected by the following claims.

At least the following is claimed:

1. A battery management system, comprising:
   a first circuit comprising a first plurality of circuit elements arranged in series, the first plurality of circuit elements comprising:
      a direct current (DC) voltage source;
      a control unit configured to detect a voltage difference from the DC voltage source across the control unit; and
      first plural switching devices, each of the first plural switching devices connected to, and operably switched by, a first detection device associated with a battery module to cause the voltage difference from the DC voltage source across the control unit responsive to detection of an event corresponding to operation of the battery module,
   wherein the DC voltage source is electrically isolated from the battery module by the respective first plural switching device during activation of the respective first plural switching device associated with the battery module and deactivation of the respective first plural switching device associated with the battery module,
   wherein the control unit is configured to cause a charge current to the battery module to be limited responsive to detecting the voltage difference from the DC voltage source across the control unit.

2. The system of claim 1, wherein the first plurality of circuit elements comprises a control circuit, and further comprising a second circuit, the second circuit comprising a second plurality of circuit elements arranged in series, the second plurality of circuit elements comprising the DC voltage source, the control unit, and second plural switching devices, each of the second plural switching devices connected to, and operably switched by, a second detection device associated with the battery module to cause a voltage difference across the control unit responsive to detection of a second event corresponding to operation of the battery module.

3. The system of claim 2, wherein the second detection device is configured to detect the second event corresponding to operation of the associated battery module, and responsive to the second detection, cause the associated switching device of the second plural switching devices to actuate, whereby the control unit responsively detects the voltage difference from the DC voltage source across the control unit.

4. The system of claim 1, wherein each of the first plural switching devices is further switchably operated by a second detection device to cause the voltage difference from the DC voltage source across the control unit responsive to detection of a different event.

5. The system of claim 4, wherein the event detected by the first detection device comprises a monitored voltage of the battery module exceeding a given voltage threshold and the different event detected by the second detection device comprises a monitored temperature of the battery module exceeding a given temperature threshold.

6. The system of claim 1, wherein the first plurality of circuit elements comprises second plural switching devices, each of the second plural switching devices connected to, and operably switched by, a second detection device associated with the battery module to cause the voltage difference from the DC voltage source across the control unit responsive to detection of a different event.

7. The system of claim 1, wherein the control unit is connected to each of the first plural switching devices, enabling identification by the control unit of one of the first plural switching devices that is operably switched by the respective first detection device.

8. The system of claim 1, wherein the control unit comprises a vehicle electrical control unit (ECU).

9. The system of claim 1, wherein the control unit comprises a controller board coupled to a vehicle electrical control unit (ECU), wherein the first circuit is controller area network (CAN)-capable.

10. The system of claim 1, wherein the first circuit further comprises a converter coupled to the DC voltage source, wherein the converter is configured to convert a first voltage to a second voltage.

11. The system of claim 1, further comprising an alarm indicator connected between terminals of the first switching device, the alarm indicator providing a visual indication, an audio indication, or a combination of both.

12. The system of claim 1, wherein the control unit is configured to receive an alarm corresponding to the event, the alarm generated by the battery module.

13. The system of claim 1, wherein the first detection device is powered by the battery module.

14. The system of claim 1, wherein the control unit is included in a second circuit comprising the DC voltage source, the first circuit further including a resistor, wherein the control unit is connected to the first and last switching devices only of the first plural switching devices, wherein the voltage difference from the DC voltage source across the control unit is detected by detecting a change in the voltage corresponding to the DC voltage source to approximately zero.

15. The system of claim 1, wherein the control unit is included in a second circuit comprising the DC voltage source, the first circuit further including a resistor, wherein the control unit is connected to each of the first plural switching devices, wherein the voltage difference from the DC voltage source across the control unit is detected by detecting a change in the voltage corresponding to the DC voltage source to approximately zero.

16. The system of claim 1, wherein the first detection device is configured to detect the event corresponding to operation of the associated battery module, and responsive to the detection, cause the associated switching device of the first plural switching devices to actuate.

17. A battery management system, comprising:
a first circuit comprising a first plurality of circuit elements arranged in series, the first plurality of circuit elements comprising:
a direct current (DC) voltage source;
a control unit configured to detect a voltage difference from the DC voltage source across the control unit; and
first plural switching devices, each of the first plural switching devices connected to a first detection device associated with a battery module, wherein the DC voltage source is electrically isolated from the battery module during activation and deactivation of a respective first plural switching device associated with the battery module,
wherein responsive to a detection of an event corresponding to operation of the battery module, the first detection device is configured to cause the associated switching device of the first plural switching devices to actuate,
whereby the control unit responsively detects a voltage difference from the DC voltage source across the control unit,
wherein the control unit is configured to cause a charge current to the battery module to be limited responsive to detecting the voltage difference from the DC voltage source across the control unit; and
a second circuit comprising a second plurality of circuit elements arranged in series, the second circuit having a normally open circuit configuration, the second plurality of circuit elements comprising the control unit, the DC voltage source, and second plural switching devices, each of the second plural switching devices connected to one of the respective first plural switching devices, wherein a closure of the second circuit causes activation of the first plural switching devices to a closed state in a reset operation.

18. The system of claim 17, wherein the closure is responsive to either actuation of the control unit or manual activation.

19. A battery management method, comprising:
detecting at a first detection device an event corresponding to an operation of a battery module, the battery module configured to power the first detection device;
responsive to the detecting, opening a first switching device, the first switching device comprising a circuit element serially arranged among a plurality of circuit elements arranged in series, the plurality of circuit elements comprising at least one additional switching device and a direct current (DC) voltage source, wherein the DC voltage source is electrically isolated from the battery module during opening and closing of the first switching device;
detecting at a control unit a voltage difference from the DC voltage source across the control unit, the voltage difference corresponding to the opened first switching device; and
providing an alarm responsive to the detecting of the voltage difference at the control unit, the alarm corresponding to the event.

\* \* \* \* \*